(12) United States Patent
Shah et al.

(10) Patent No.: US 10,731,825 B2
(45) Date of Patent: Aug. 4, 2020

(54) LINEAR OPTIC AND LED LIGHTING FIXTURE

(71) Applicant: AMERLUX LLC, Oakland, NJ (US)

(72) Inventors: Paresh Shah, Piscataway, NJ (US); Feng Zhao, Newburgh, NY (US); Jonathan Walsh, Pequannock, NJ (US)

(73) Assignee: AMERLUX LLC, Oakland, NJ (US)

( * ) Notice: Subject to any disclaimer, the term of this patent is extended or adjusted under 35 U.S.C. 154(b) by 0 days.

(21) Appl. No.: 16/413,895

(22) Filed: May 16, 2019

(65) Prior Publication Data
US 2019/0353324 A1 Nov. 21, 2019

Related U.S. Application Data

(60) Provisional application No. 62/672,923, filed on May 17, 2018.

(51) Int. Cl.
| F21V 5/04 | (2006.01) |
| F21V 5/02 | (2006.01) |
| F21V 7/00 | (2006.01) |
| F21Y 103/10 | (2016.01) |
| F21Y 115/10 | (2016.01) |

(52) U.S. Cl.
CPC .............. F21V 5/04 (2013.01); F21V 5/02 (2013.01); F21V 7/0091 (2013.01); *F21Y 2103/10* (2016.08); *F21Y 2115/10* (2016.08)

(58) Field of Classification Search
CPC . F21V 5/04; F21V 5/02; F21V 7/0091; F21Y 2115/10; F21Y 2103/10
See application file for complete search history.

(56) References Cited

U.S. PATENT DOCUMENTS

| 3,654,455 A * | 4/1972 | Siegel | F21V 5/02 |
| | | | 362/297 |
| 4,536,056 A * | 8/1985 | Oguino | H04N 9/31 |
| | | | 348/786 |
| 6,950,234 B1 * | 9/2005 | Onishi | G02B 1/105 |
| | | | 359/449 |

(Continued)

FOREIGN PATENT DOCUMENTS

| JP | 56-41804 B2 | 12/2014 |
| JP | 2017-59518 A | 3/2017 |

(Continued)

OTHER PUBLICATIONS

International Search Authority's International Search Report and Written Opinion for corresponding international application No. PCT/US2019/032612, dated Sep. 12, 2019.

*Primary Examiner* — Donald L Raleigh
(74) *Attorney, Agent, or Firm* — Day Pitney LLP

(57) ABSTRACT

An optical lens and optical lighting system comprising the optical lens, the optical lens comprising a top surface having a plurality of ridges and a bottom surface having a substantially v-shaped indent, wherein at least one of the top and bottom surface comprises a plurality of prisms. The optical lighting system comprises an assembly for receiving the optical lens, the assembly comprising a fixture body for releasably securing the optical lens, one or more LED boards, each comprising one or more LED lights, and a plurality of feet adjacent to the optical lens configured to hold the LED board thereon such that the LED board abuts the optical lens.

19 Claims, 7 Drawing Sheets

(56) References Cited

U.S. PATENT DOCUMENTS

| | | | | |
|---|---|---|---|---|
| 8,038,327 B1* | 10/2011 | Franck | ............. | F21V 3/049 362/249.02 |
| 8,939,634 B2* | 1/2015 | Leadford | ............. | F21V 5/04 362/647 |
| 10,253,948 B1* | 4/2019 | Pickard | ............. | F21V 7/0091 |
| 2002/0003708 A1* | 1/2002 | Roller | ............. | B60Q 1/32 362/521 |
| 2006/0018623 A1* | 1/2006 | Yu | ............. | G02B 6/0038 385/146 |
| 2007/0031106 A1* | 2/2007 | Yamashita | ............. | G02B 6/0011 385/146 |
| 2009/0262420 A1* | 10/2009 | Yun | ............. | H04N 13/305 359/463 |
| 2011/0156584 A1* | 6/2011 | Kim | ............. | F21K 9/00 315/32 |
| 2013/0194823 A1* | 8/2013 | Yagi | ............. | G02B 6/0038 362/607 |
| 2013/0223057 A1* | 8/2013 | Gassner | ............. | F21S 8/04 362/223 |
| 2014/0133181 A1* | 5/2014 | Ishida | ............. | G02B 6/0036 362/613 |
| 2014/0160755 A1* | 6/2014 | Dureiko | ............. | F21V 5/08 362/240 |
| 2014/0218909 A1* | 8/2014 | Tetsuo | ............. | F21V 5/043 362/231 |
| 2014/0233231 A1* | 8/2014 | Howe | ............. | F21V 3/0625 362/235 |
| 2015/0338053 A1* | 11/2015 | Rector | ............. | F21V 5/02 362/224 |
| 2016/0320025 A1* | 11/2016 | Ebner | ............. | G02B 19/0066 |
| 2017/0030537 A1* | 2/2017 | Powell | ............. | F21S 2/00 |
| 2017/0082261 A1* | 3/2017 | Yamada | ............. | F21V 5/008 |
| 2017/0102493 A1* | 4/2017 | Shivell | ............. | G01J 5/24 |
| 2017/0242182 A1* | 8/2017 | Diana | ............. | G02B 6/0058 |
| 2019/0093837 A1* | 3/2019 | Dicken | ............. | F21S 8/033 |
| 2019/0227382 A1* | 7/2019 | Watanabe | ............. | G02B 6/0021 |
| 2019/0339003 A1* | 11/2019 | Signorino | ............. | F25D 23/06 |

FOREIGN PATENT DOCUMENTS

| | | |
|---|---|---|
| JP | 2017-069111 A | 4/2017 |
| WO | 2017-217303 A1 | 12/2017 |

* cited by examiner

LINEAR OPTIC AND LED LIGHTING FIXTURE

CROSS-REFERENCE TO RELATED APPLICATIONS

The present patent application is related to and claims the benefit of priority of U.S. Provisional Application Ser. No. 62/672,923, filed May 17, 2018. The aforementioned patent application is incorporated by reference herein in its entirety for any purpose whatsoever.

BACKGROUND

Field of the Invention

The present invention relates to an optic lens and lighting system. More specifically, the invention relates to an optical lighting system comprising an assembly for receiving a lens and designed for providing for an optimal and precise distribution of light.

Description of the Related Art

Lighting systems are often used to illuminate various indoor areas. A common indoor space that uses lighting systems is an office. Generally, office spaces have low ceilings, and are therefore limited to recessed ceiling fixtures for illumination. Low ceiling offices rarely use ceiling pendant fixtures, given that the low ceiling results in poor light levels and narrow distribution of light. Thus, there exists a need in the art for an office pendant light fixture, wherein the light fixture hangs from and close to the ceiling.

In the field of optics, anidolic lighting systems have commonly been used to provide bright and evenly distributed light in poorly lit areas. Anidolic lighting systems receive exterior light beams from the bottom portion of a lens, then use the lens or a mirror to capture the exterior light beams, and redirect them outwardly to produce scattered rays. Originally, anidolic lighting systems captured the natural light from the sun and refracted it outwardly to illuminate a room.

In present day, anidolic lighting systems use light emitting diodes ("LEDs") for light capturing, so that the intensity of the light can be captured in lenses of a size designed for such indoor lighting systems. LEDs are comprised of solid semi-conductor material, which react with particles of an electric current to produce light. LEDs are directional light sources, and therefore can only illuminate in a designated direction. In addition to their limited directional lighting, the light emitted from the LEDs' primary optic is heavily concentrated, and therefore the intensity of the output decreases as the distance from the light source increases. Generally, LEDs are coupled with various secondary optics to aid in collimating light, increasing light distribution and directionality, and improving uniformity.

One variety of optics frequently coupled with LEDs are total internal reflection ("TIR") lenses. TIR lenses are made from injection molded acrylic polymers and are conically shaped. In a TIR lens, light waves strike the interface between two forms of media each having different refractive indices. The angle at which the light waves strike is too great for light to pass through the interface, thus reflecting a collimated and controlled beam from the center of the emitter. The conical shape of TIR lenses allows them to maintain rotational symmetry and emit the desired intensity of light at a variety of angles. In order to diffuse the light beams, widen the beam spread, or shape the light distribution, TIR lenses are carved with a variety of ripples or ridges. Though TIR optics improve LED light emission, TIR optics could provide inadequate light diffusion, glare, and gradient distribution. Thus, there exists a need in the art for an improved TIR optic lens that is coupled with LEDs for indoor applications in a manner that adequately controls the light distribution.

The type of lens used in a lighting system determines the type of light distribution. Light distribution can be measured using a photometric polar diagram ("polar plot"). A polar plot conveys whether the flow of light, or flux, is directed upwards or downwards. The distance from the center of the polar plot to one of the points on the outline of the diagram corresponds to a the luminous intensity value, these values are measured in "candelas." Alternatively, polar plots are measured in "candelas per kilolumen." Generally, the curves on a polar plot are equal regardless of the lighting element used, but the flux can vary.

The present invention is an optic system having a lens that produces an improved moth wing light distribution to provide precise an optimal light distribution for indoor applications.

SUMMARY OF THE INVENTION

Disclosed herein is an optical system including a TIR lens and an LED board assembly. The optical system of the present disclosure is configured to create a wider and more even light distribution using the TIR lens for indoor applications. Preferably, by incorporating into the TIR lens a V-shaped apex and a plurality of ridges and prisms for refracting light, the present optical system can direct a light source in the exact desired direction and intensity.

The optical system of the present disclosure includes a unique, preferably elongated rectangular lens having an apex located proximally on the top surface of the lens with ridges set at an equal distance from one another, along the length of the top surface of the lens. The ridges work with prisms located on the left and right sides of the lens to reflect the light in an upward and outward direction. On the bottom surface of the lens is a TIR component configured in a V-shaped indent. The V-shaped indent directs light in an upward direction such that it is reflected by the top surface prisms and ridges. The bottom surface of the lens can also have bottom surface prisms which aid to direct certain reflected light upward and only allow a certain percentage or intensity of light to be directed downward.

The optical system of the present disclosure also includes an assembly configured for receiving the lens. The assembly can include a fixture body located on either side of the lens to secure the lens within the assembly, the fixture body comprising an LED board having a plurality of LED lights spaced equally along the length thereof, end caps on either end of the lens securing all assembly components, and a hanging bridge sitting atop the lens and the fixture body to allow for hanging of the assembly from a ceiling.

BRIEF DESCRIPTION OF DRAWINGS

The features and advantages of the invention are apparent from the following description taken in conjunction with the accompanying drawings in which.

DETAILED DESCRIPTION OF THE INVENTION

The present invention relates to an optic lens and lighting system. A preferred embodiment of the present invention is described herein. The present invention comprises a lens 200 and an assembly 210 for receiving a lens 200. The lens 200 is of a rectangular shape and of a thickness of preferably 0.350-0.400 inches. The lens 200 may be fabricated by techniques such as injection molding, extrusion and the like. Various finishing techniques, such as polishing, may be undertaken.

Figure 1:
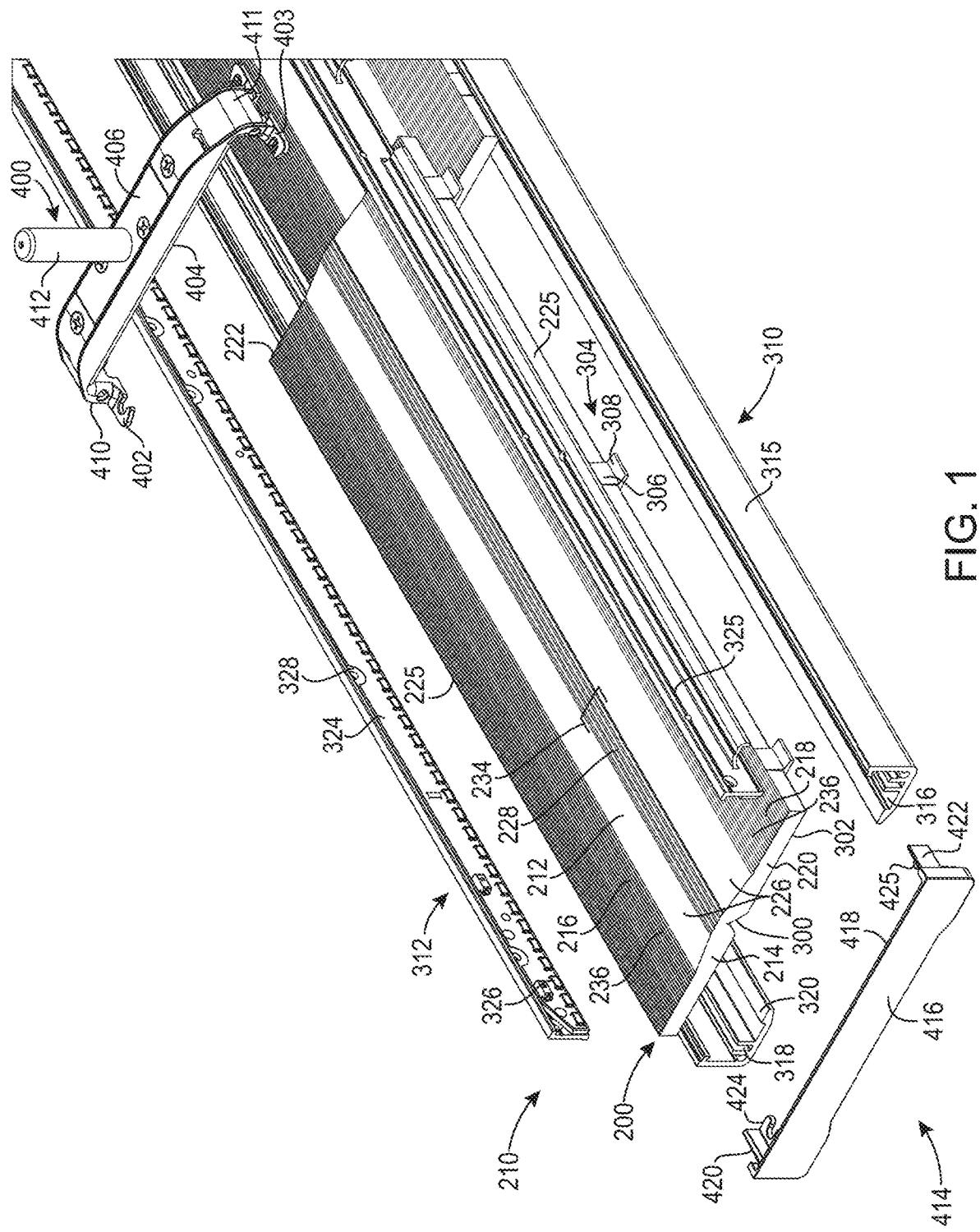
FIG. 1 is an exploded view of a first embodiment of the lighting system of the present invention.
Figure 2:
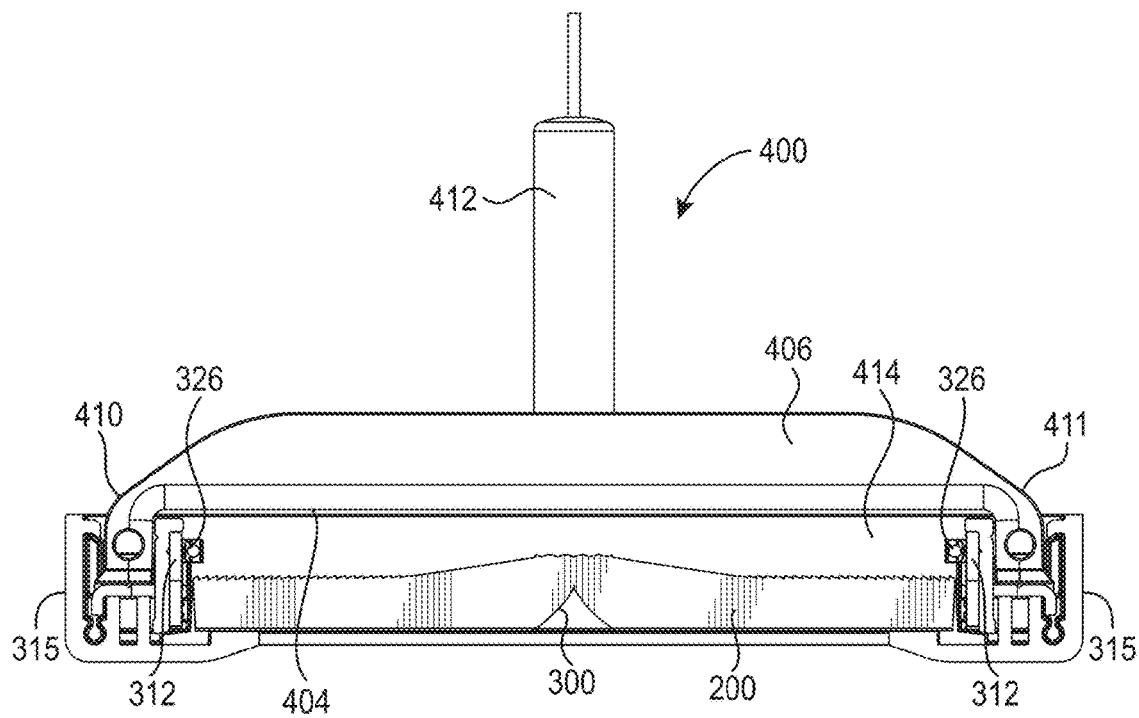
FIG. 2 is a cross sectional view of the lighting system seen in FIG. 1.
Figure 4:
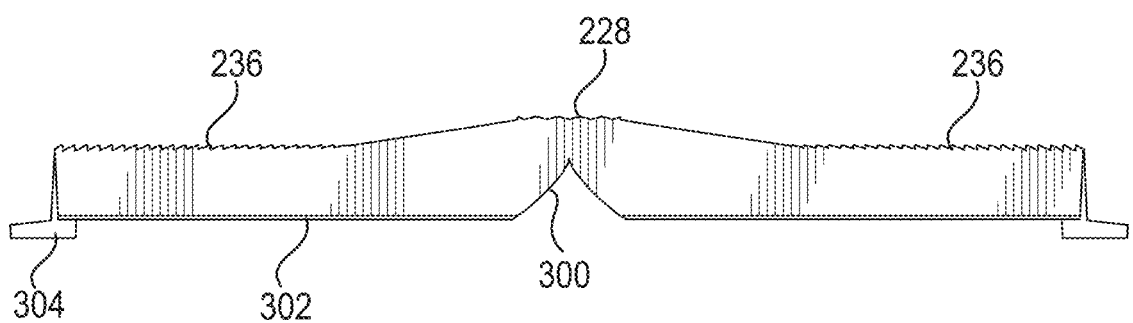
FIG. 4 is a cross sectional view of the optical lens element of the lighting system seen in FIG. 1.

It can be appreciated that the lens 200 is preferably comprised of a translucent lighting-grade polymer or other translucent or lighting-grade material. As seen in FIGS. 1, 2, and 4, lens 200 consists of top surface 212 and bottom surface 214, front face 220 and rear face 222, and a plurality of sides 216, 218, 225. The top surface 212 may be comprised of gradual slopes 226 on both sides of the apex 228, the gradual slopes 226 forming flat left edge 216 and right edge 218 across the length of the lens 200. The apex 228 of the slopes 226 is located proximal to the top surface 212 of the lens 200, the apex 228 running down the length of the lens 200. The apex 228 may contain a plurality of ridges 234 down the length of the lens 200, the ridges 234 preferably spaced equidistant and parallel to one another. The left edge 216 and right edge 218 of the lens 200 may each contain a plurality of top surface prisms 236 extending across the length of the lens 200 and the width of left edge 216 and right edge 218. Preferably, the top surface prisms 236 cease as left edge 216 and right edge 218 turn into slopes 226 directed upward towards the apex 228 in the center of the top surface 212. The inside of the lens 200 may have a plurality of slanted lines (not pictured) lacking a radius at any point. The plurality of ridges 234 on the apex 228 and the plurality of top surface prisms 236 work together to direct light upward and widen the angle of light distribution.

In the illustrated embodiment seen in FIG. 1, lens 200 has a TIR component located on the bottom surface of the lens 200, distal to the apex 228. The TIR component can be concave, forming a V-shaped indent 300 which has a height shorter than the total depth of the lens 200.

On bottom surface 214, below left edge 216 and right edge 218, additional bottom surface prisms 302 may be provided. The bottom surface prisms 302 extend across the entire length of the lens 200 and the width of left and right edges 216, 218. In a preferred embodiment, the bottom surface prisms 302 extend further across the width of the lens 200 than the prisms 236 located on the top surface 212, which stop at slopes 226, thereby continuing until the opening of the V-shaped indent 300 of the TIR component. The bottom surface prisms 302 aid in directing the light upward, such that the light can be reflected by the top surface prisms 236 and the ridges 234 on the apex 228.

In such an embodiment LED lights 326, located on both edges of the length of the lens 216, 218, are positioned as close as possible to the lens 200 and emit light directly into the lens 200, thereby guiding all of the light that is emitted directly into the lens 200. The V-shaped indent 300 on the bottom surface of the lens 200 directs the light directly upward, thereby acting as a TIR component. When the light is emitted from the LED lights 326, the top surface of the lens 200 acts as a mirror, reflecting all the light that comes through. The slope 226 on the top surface of the lens 212 directs the light straight up without any deflection. This feature is of significance, because a straight tip directs the light outward, as the light would be coming from a plastic medium to the air. The top surface prisms on the left and right sides 236 of the top surface of the lens 212 direct the light upward and out in different directions.

The bottom surface prisms 302 also control the light direction. In a first embodiment of the present invention seen in FIGS. 1-5, the angle of V-shaped indent 300 of the TIR component, the top surface prisms 236, ridges 234, and bottom surface prisms 302 work together to result in a distribution of light with 85% of light directed upward and 15% of light directed downward. These features also limit the amount of light that is directed downward, thereby making the lens as translucent as possible.

By way of example and as seen in the cross-sectional view of FIG. 4, top surface 212 of the lens 200 preferably has a width of 3.937 inches, extending from the end of left edge 216 to the end of right edge 218. The bottom surface 214 of the lens extending from the outer edge of one foot 304 to the other foot 304 is 4.274 inches. The thickness of the lens 200, from the bottom surface 214 to the apex 228, is 0.395 inches. Whereas, the thickness of the lens from the bottom surface to the top of the flat wings is 0.283 inches. The feet 304 have a thickness of 0.072 inches. The dimensions set forth in FIG. 4 and described herein are not intended to be limiting, but rather are exemplary and serve to evidence the relationship between the different dimensions of the lens of the present invention.

Figure 5:
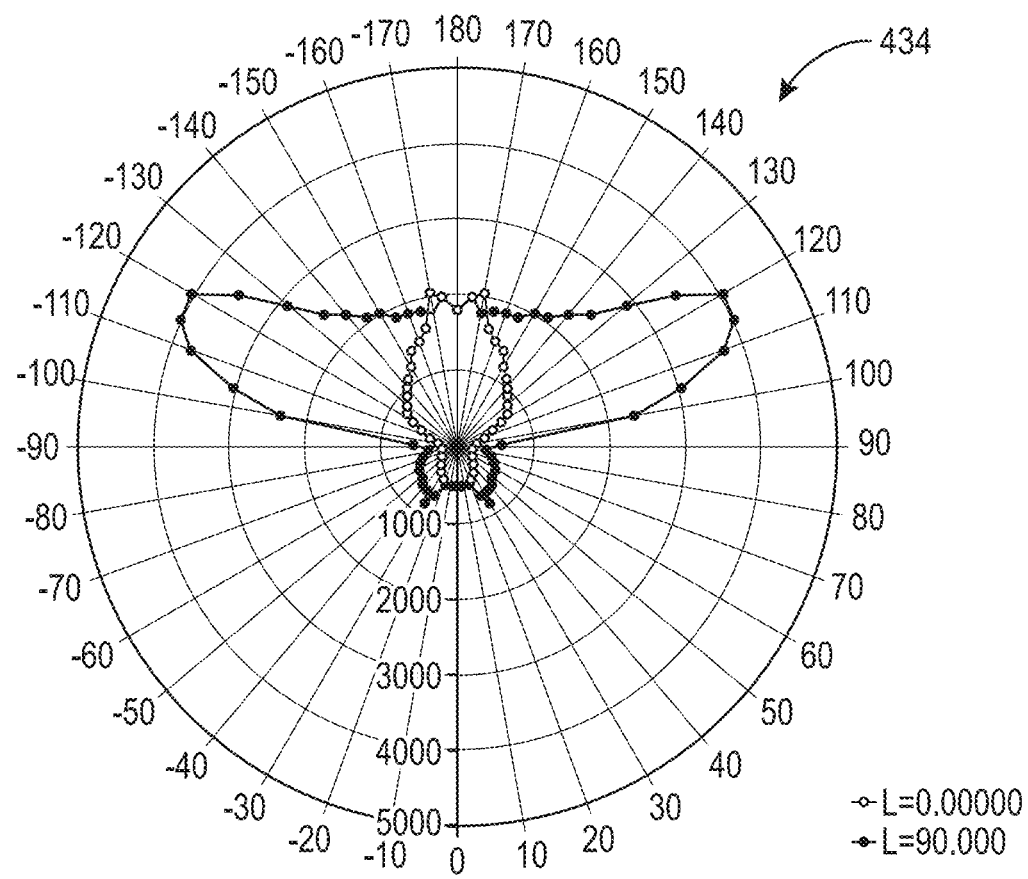
FIG. 5 is an exemplary photometric polar plot depicting light distribution from the optical lens of the lighting system seen in FIG. 1.

As seen in the example set forth in FIG. 5, the first embodiment of the present invention produces a photometric polar plot 434 depicting light distribution in the shape of a moth wing. It will be appreciated that the present invention provides an improvement in the art. The moth wing light distribution projects light outward but is dim in the center, such that the light is evenly distributed on both the sides and the center of the moth wing. In so doing, the present invention widens and evens the light distribution.

In a second embodiment, as seen in FIGS. 6-10, lens 500 can be configured in a way that it acts as both a direct and indirect lens, such that 55% of light is directed upward and 45% of light is directed downward. The lens 500 in the second embodiment does not have an apex on the top surface of the lens as was seen in FIG. 1, but rather lens 500 has a TIR component with a V-shaped indent 60i on the top surface 612 of the lens 500 and a V-shaped indent 602 on the bottom surface 614 of the lens 500. Thus, ridges 634 in this embodiment are located on either side of the top-surface V-shaped indent 601. The top surface prisms 636 extend across the length of the lens 500 and the width of the left edge 616 and right edge 618. The prisms 636 cease as left edge 616 and right edge 618 turn into slopes 626.

Figure 9:
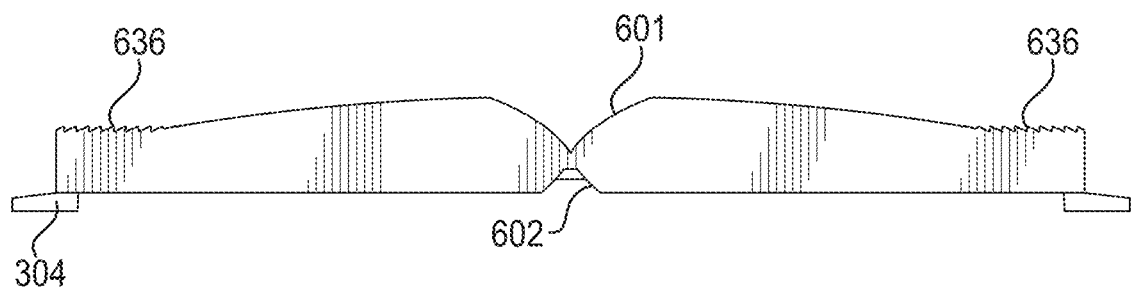
FIG. 9 is a cross sectional view of the optical lens element of the lighting system seen in FIG. 6.
Figure 10:
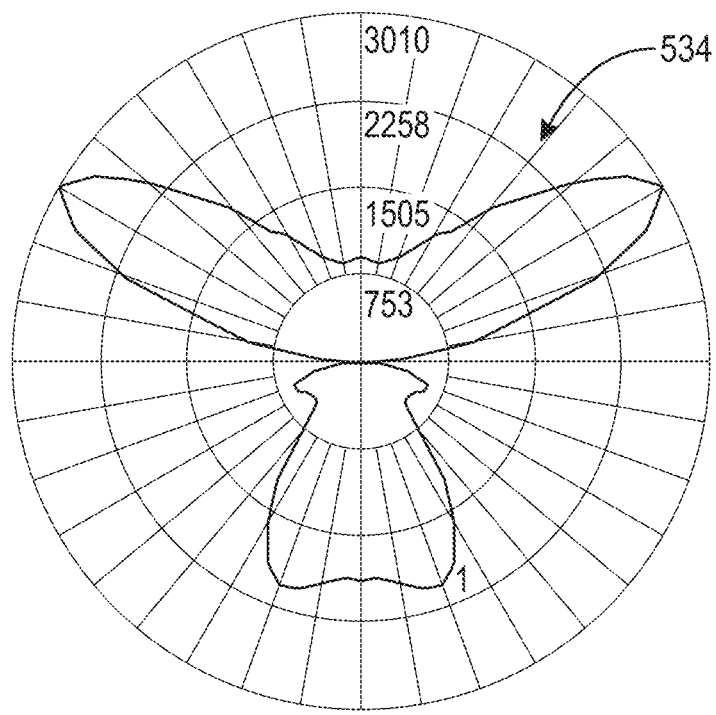
FIG. 10 is an exemplary photometric polar plot depicting light distribution from the optical lens element of the lighting system seen in FIG. 6.

As seen in the example in FIG. 9, the lens 500 has a top surface 612 width of 3.937 inches, extending from the outside of left edge 616 to the outside of right edge 618. The bottom surface 614 of the lens 500, extending from the edge of one foot 304 to the other foot 304 is 4.274 inches. The thickness of the lens 500, from the bottom surface 614 of the lens 500 to the top of slopes 626, is 0.366 inches, whereas, the thickness of the lens 500 from the bottom surface 614 to the top of left and right edges 616, 618 is 0.254 inches. The feet 304 have a thickness of 0.070 inches. As seen the example seen in FIG. 10, this embodiment produces a photometric polar plot 534 with a direct and indirect light distribution that's appears a moth wing design representing the indirect light distribution with flat-bottom tear drop representing the direct light distribution. As with the first embodiment, the dimensions set forth in FIGS. 6 and 9, described herein, are not intended to be limiting, but rather are exemplary and serve to evidence the relationship between the different dimensions of the lens of the present invention.

Figure 6:
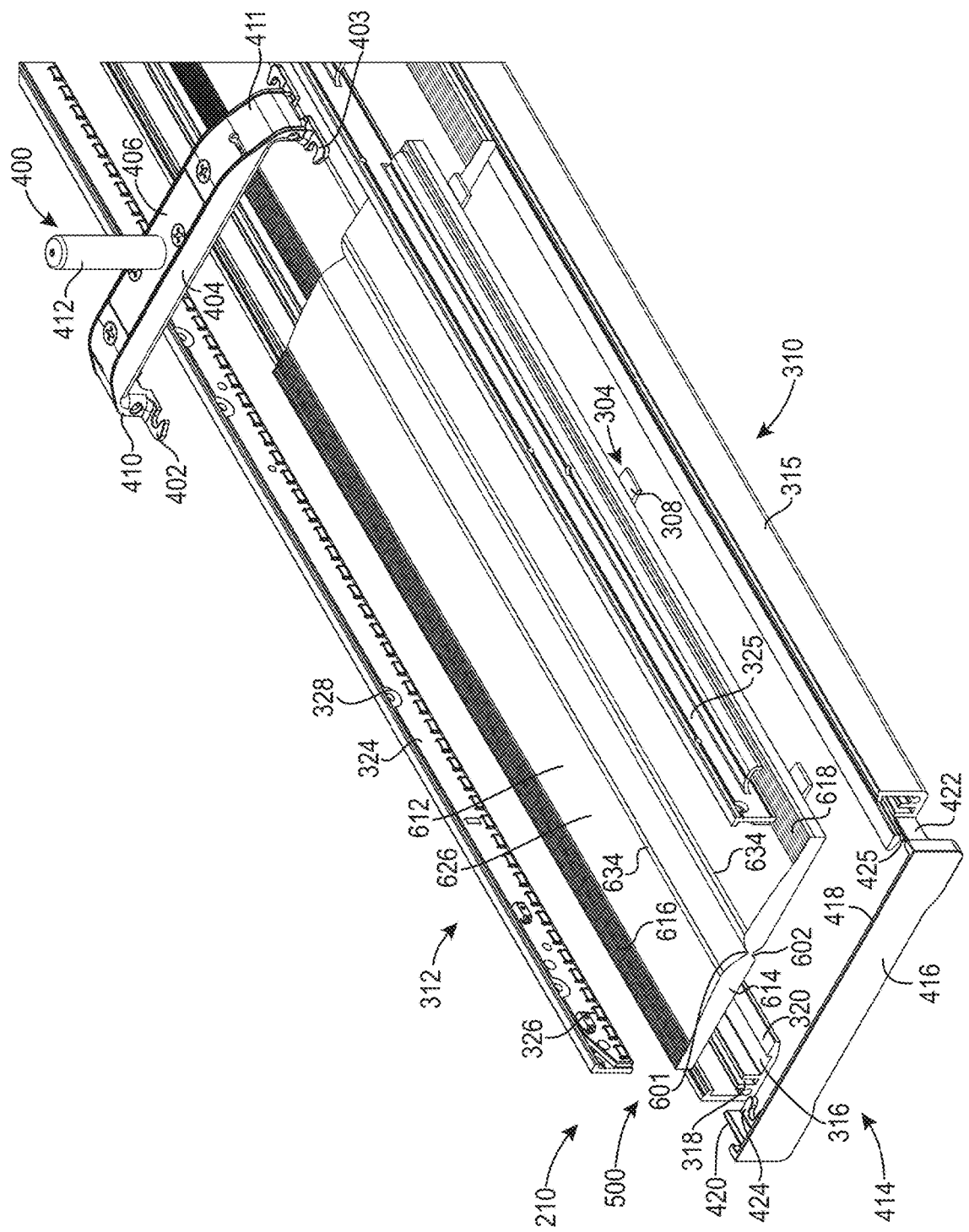
FIG. 6 is an exploded view of a second embodiment of the lighting system of the present invention.
Figure 7:
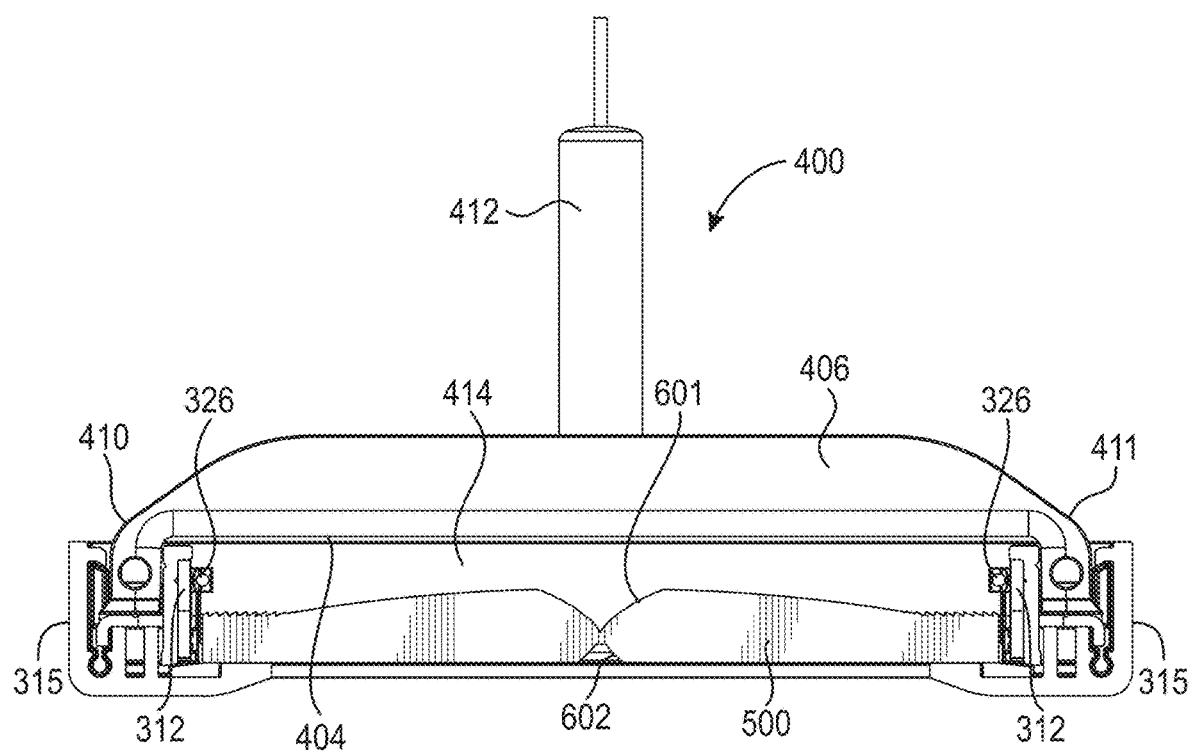
FIG. 7 is a cross sectional view of the lighting system seen in FIG. 6.

As seen in FIGS. 1 and 4, located on the left and right edges 216, 218 of the length of the lens 200 are a plurality of feet 304. In the example of the first embodiment, as seen in FIGS. 1 and 4, the feet 304 have a first side 306, a second side 307 (not pictured), and an underside 308 positioned perpendicularly to the first side 306. The underside 308 can run partially under the bottom surface 214 of the lens 200, and protrude outwardly. The second side of each foot 307 can be affixed adjacent to the sides 225 of the lens 200 while the first side 306 faces an outward direction. As seen in FIGS. 6 and 9, feet 304 do not have first and second sides, but only an underside 308 running partially under the bottom surface 614 of the lens 500 and protruding outwardly.

In a preferred embodiment, the feet 304 are spaced equidistant from each other along the length of the lens, and it will be appreciated that the feet 304 can be positioned such that they do not impact the transparency of the lens 200 and its ability to reflect light. The feet 304 can also be translucent or opaque and can be constructed of an injection molding, preferably an acrylic polymer. The feet 304 can be comprised of the same polymer as that of the lens 200, and are molded to the lens 200 itself.

As seen in FIGS. 1 and 2, the feet 304 fit within a fixture body 310 comprising two identical, but flipped, components 315 for receipt of the lens 200, each component 315 consists of an elongated rigid metal part having a pocket 316 and cavity 318 for securing the lens 200 and LED board 312, respectively. The components 315 of the fixture body 310 can incase both the lengthwise edges 216, 218 of the lens 200 and the LED board 312 on either side. The fixture body 310 can be constructed of rigid metal. In one embodiment, the fixture body 310 is an L-shape configuration, though other geometric configurations are envisioned to obtain the same light distribution and function. The upright portion of the fixture body 310 may hold and conceal the LED board 312 and the edge of the lens 200. In the embodiment illustrated in FIG. 1, the bottom of the "L" runs under the lens 200 and has a cavity 318 adjacent to a stopper 320, such that the feet 304 of the lens 200 fit within the cavity 318 of the fixture body 310 and are secured by the stopper 320 of the fixture body 310.

Running alongside the cavity 318 within each component 315 of the fixture body 310 is a pocket 316 for receiving an LED board 312. The LED board 312 is preferably rectangular or elongated, having a front surface 324 and a rear surface 325, configured to be assembled with the lens 200 such that a plurality of intermittently staggered led lights 326 thereon fit adjacent to and on top of the lens 200. The lights 326 of the LED board 312 are positioned such that the entirety of the light emitted is directed into the lens 200. Pockets 316 hold the LED board 312, covering half of the board 312, so that the LED lights 326, running along the inside of the LED board 312, are uncovered and sit adjacent to the edges 216, 218 of the lens 200. The pocket 316 holds the LED board 312 such that the LED lights 326 are as close to the lens 200 as possible, preventing the pixilation of the light emitted and preventing dark spots within the light distribution. The LED board 312 may be comprised of a rigid metal material and has small protrusions 328 along the length thereof. The protrusions 328 are located along the front surface 324 of the LED board 312 and are preferably designed for receiving left 402 and right 403 hooks of the hanging bridge 400.

The hanging bridge 400 has a flat underside 404 and dome shaped top surface 406. The flat underside 404 sits above the top surface 212 of the lens 200. Extending from the sides of the dome shaped top surface 406 are a set of arms 410, 411. Each arm 410, 411 of the hanging bridge 400 contains a set of hooks 402, 403 extending outwardly on either side of the arm 410, 411 which are configured to attach through the protrusions 328 located on the LED board 312 and thereby fasten the hanging bridge 400 to the LED board 312 and fixture body 310, and secure the arms 410, 411 around the edges 216, 218 of the lens 200. In a preferred embodiment, a cylindrical fixture 412 is affixed to the top surface 406 of the hanging bridge 400, thereby allowing the optic system to hang from a ceiling.

Located at the front face 220 and rear face 222 of the lens 200 are end caps 414, having front 416 and back 418 sides, and left 420 and right 422 ends. Each end cap 414 has a set of hooks 424, 425 at the left 420 and right 422 ends. The hooks 424, 425 extend outwardly and fasten onto the fixture body 310, which secures the end caps 414 onto the assembly 210 such that the back side 418 of each end cap 414 sits adjacent to the front face 220 and rear face 222 of the lens 200, respectively.

Figure 3:
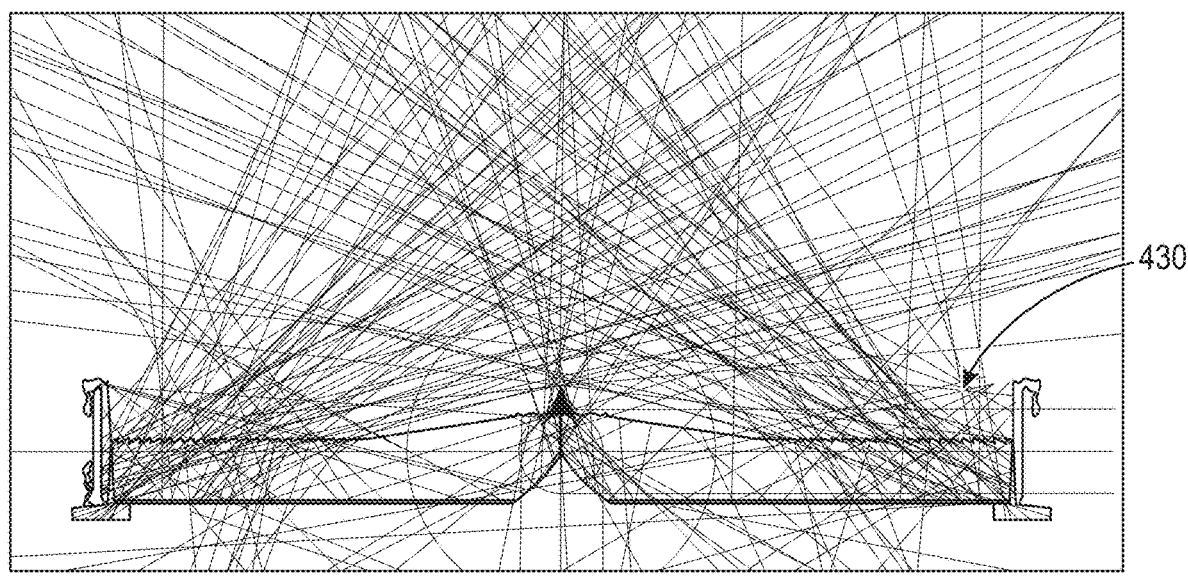
FIG. 3 is a front elevational view of the optical lens element of the lighting system seen in FIG. 1 showing an exemplary ray trace of light distribution.
Figure 8:
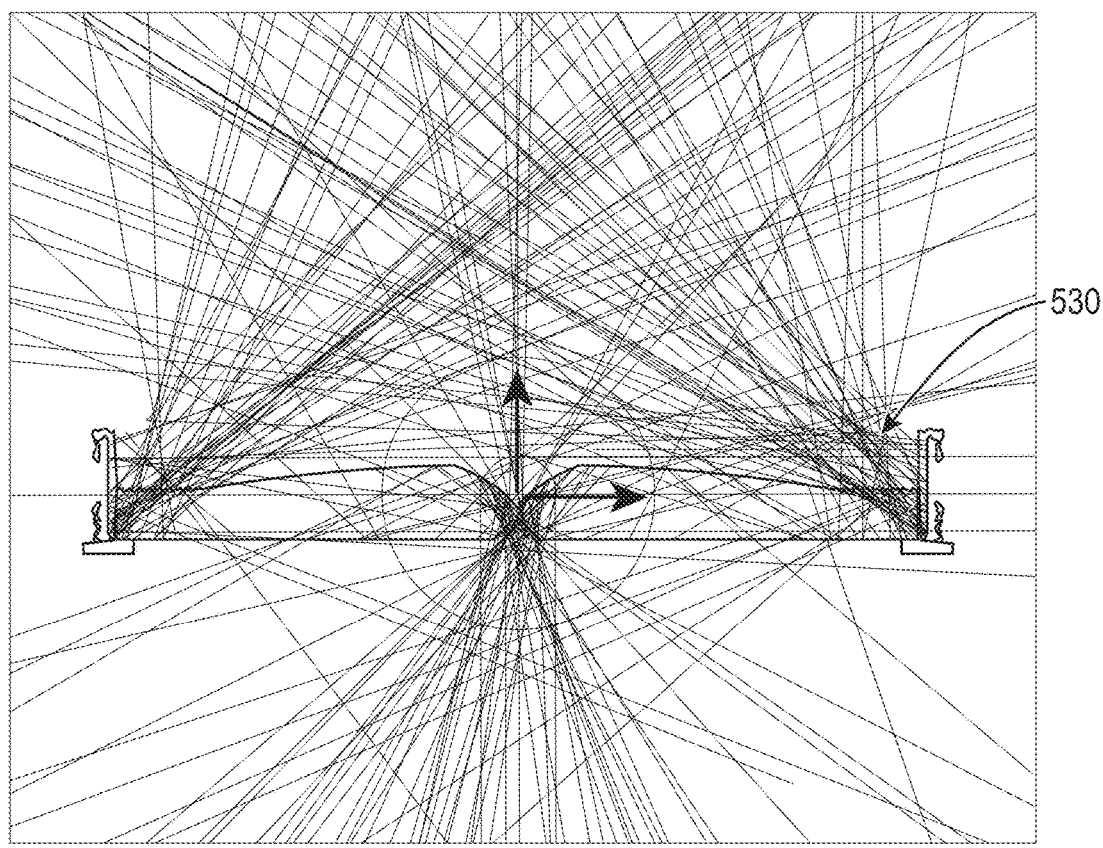
FIG. 8 is a front elevational view of the optical lens element of the lighting system seen in FIG. 6 showing an exemplary ray trace of light distribution.

The first embodiment of the present invention creates a ray trace 430, as seen in FIG. 3, having a wide even distribution of light where 85% of the light emitted is directed upward, and 15% of the light is directed downward. The second embodiment of the present invention creates a ray trace 530, as seen in FIG. 8, having a wide even distribution of light where 55% of the light emitted is directed upward, and 45% of the light is directed downward.

A third embodiment of the present invention is seen in FIG. 1*i*, wherein the optical lens 200 as seen in FIG. 1 is cut in half. In this embodiment, a similar light source to that of FIG. 1 can be used, but can provide a wall fixture with wide, shallow light distribution in one direction, and would be exemplified by a half-moth wing distribution on the polar plot.

Figure 11:
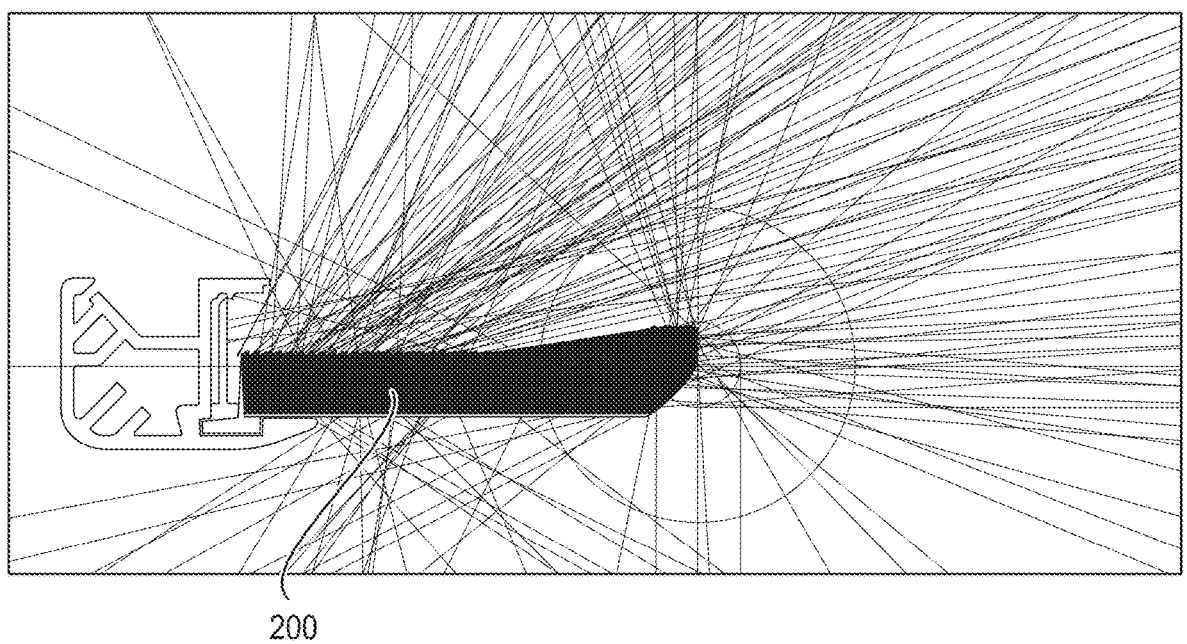
FIG. 11 is a cross-sectional view of a third embodiment of the optical lens element of the present invention showing an exemplary ray trace of light distribution.

It is noted that wherever distinctions are not drawn between the embodiments, any reference to a component in the first embodiment of FIGS. 1-5 can also be utilized and found in the second embodiment of FIGS. 6-10 and the third embodiment of FIG. 11.

Embodiments of the optic disclosed herein may be useful in a variety of linear lighting systems and similar embodiments thereof (such as shaped or curved systems) where one linear array of LED elements effectively flanks a second linear array of LED elements. It will be appreciated that the optic provides a design for controlling and directing light in an upward direction, and widening and evening angle distribution, while maintaining translucency of the lens.

The optic may be particularly useful in linear extensions of the lighting system. The lighting system may be fabricated by selecting an appropriately sized optic and installing the optic into a lighting fixture. The optic may be installed in an existing lighting fixture as a retrofit of the fixture. Measurements, geometries, proportions and other physical aspects as shown in the drawings are illustrative and not limiting of the teachings herein.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An optical lighting system comprising:
    an optical lens, comprising a top surface having a plurality of ridges and a bottom surface comprising a substantially v-shaped indent, wherein at least one of the top and bottom surface comprises a plurality of prisms; and
    an assembly for receiving the optical lens, wherein the assembly comprises:
      a fixture body for releasably securing the optical lens;
      one or more LED boards, each comprising one or more LED lights; and
      a plurality of feet adjacent to the optical lens configured to hold the LED board thereon such that the LED board abuts the edge of the optical lens; and
    wherein the plurality of ridges and the plurality of prisms are configured to direct light from the one or more LED lights in both an upward and downward distribution simultaneously.

2. The optical lighting system accordingly to claim 1, wherein the optical lens is a TIR lens.

3. The optical lighting system accordingly to claim 1, wherein the optical lens comprises a light distribution of 55% up and 45% down.

4. The optical lighting system accordingly to claim 1, wherein the optical lens comprises a light distribution of 85% up and 15% down.

5. The optical lighting system according to claim 1, wherein the optical lens is an elongated rectangular shape.

6. The optical lighting system according to claim 1, wherein the top surface of the optical lens comprises:
    an apex in the center thereof; and
    gradual slopes forming flat edges on either side of the apex;
    wherein the plurality of ridges are located along the apex; and
    wherein the plurality of prisms are located on the flat edges.

7. The optical lighting system according to claim 1, wherein the plurality of feet are positioned along the optical lens such that the feet do not impact the transparency of the lens the light distribution therefrom.

8. The optical lighting system according to claim 1, wherein the fixture body comprises one or more elongated parts, each of said elongated parts comprising a pocket for receiving the optical lens and a cavity for receiving one of one or more LED boards.

9. The optical lighting system according to claim 8, wherein the one or more elongated parts comprise rigid metal material.

10. The optical lighting system according to claim 1, wherein the one or more LED boards are configured to releasably secure to a hanging bridge.

11. The optical lighting system according to claim 10, wherein the hanging bridge further comprises:
    a flat underside and dome shaped top surface; and
    a fixture for securing the hanging bridge to a ceiling.

12. The optical lighting system according to claim 1, wherein the fixture body comprises one or more end caps for securing the optical lens within the fixture body.

13. An optical lens, comprising:
    a top surface, a bottom surface, and a plurality of side surfaces;
    the top surface comprising a plurality of ridges; and
    the bottom surface comprising a substantially v-shaped indent;
    wherein at least one of the top and bottom surface comprises a plurality of prisms;
    wherein the plurality of ridges and the plurality of prisms are configured to direct light from one or more external LED lights in both an upward and downward distribution simultaneously.

14. The optical lens accordingly to claim 13, wherein the optical lens is a TIR lens.

15. The optical lens accordingly to claim 13, wherein the optical lens comprises a light distribution of 55% up and 45% down.

16. The optical lens accordingly to claim 13, wherein the optical lens comprises a light distribution of 85% up and 15% down.

17. The optical lens accordingly to claim 13, wherein the optical lens is an elongated rectangular shape.

18. The optical lens accordingly to claim 13, wherein the top surface of the optical lens comprises:
    an apex in the center thereof; and
    gradual slopes forming flat edges on either side of the apex;
    wherein the plurality of ridges are located along the apex; and
    wherein the plurality of prisms are located on the flat edges.

19. The optical lens accordingly to claim 13, wherein a plurality of feet are positioned along the optical lens such that the feet do not impact the transparency of the lens the light distribution therefrom.

* * * * *